United States Patent [19]

Hiraiwa et al.

[11] 4,177,886

[45] Dec. 11, 1979

[54] PARKING BRAKE MECHANISM FOR MOTOR VEHICLE EQUIPPED WITH POWER TRANSMISSION WITH TORQUE CONVERTER

[75] Inventors: Kazuyoshi Hiraiwa, Ome; Kotei Takahashi, Tokyo, both of Japan

[73] Assignee: Nissan Motor Company, Limited, Yokohama, Japan

[21] Appl. No.: 819,167

[22] Filed: Jul. 26, 1977

[30] Foreign Application Priority Data

Jul. 27, 1976 [JP] Japan ................... 51-89473

[51] Int. Cl.² ............................................ B60K 29/02
[52] U.S. Cl. ..................... 192/4 A; 188/31; 188/1 A
[58] Field of Search ............... 192/4 A; 188/31, 60, 188/69

[56] References Cited

U.S. PATENT DOCUMENTS

| | | | |
|---|---|---|---|
| 2,875,856 | 3/1959 | Mrlik et al. ............. | 192/4 A X |
| 3,601,230 | 8/1971 | Platz ........................ | 192/4 A X |
| 3,601,231 | 8/1971 | Kolacz et al. ............ | 192/4 A X |
| 4,031,977 | 6/1977 | Grosseau ................. | 192/4 A X |

FOREIGN PATENT DOCUMENTS 2060883  7/1971  Fed. Rep. of Germany .......... 192/4 A

*Primary Examiner*—Benjamin Wyche
*Attorney, Agent, or Firm*—Schwartz, Jeffery, Schwaab, Mack, Blumenthal & Koch

[57] ABSTRACT

A positive parking brake for a vehicle with a transmission output shaft having a pair of gears rotatable thereon. A hub is fixed to the shaft between the gears and a clutch sleeve is axially slidably splined to the hub periphery whereby the sleeve and hub may be selectively coupled to the clutch teeth or either gear. A sleeve shifter fork has an opening therethrough whereby a braking pawl may be operated by a cam and spring device so as to extend through the fork opening to engage brake teeth on the sleeve periphery and brake the vehicle.

11 Claims, 9 Drawing Figures

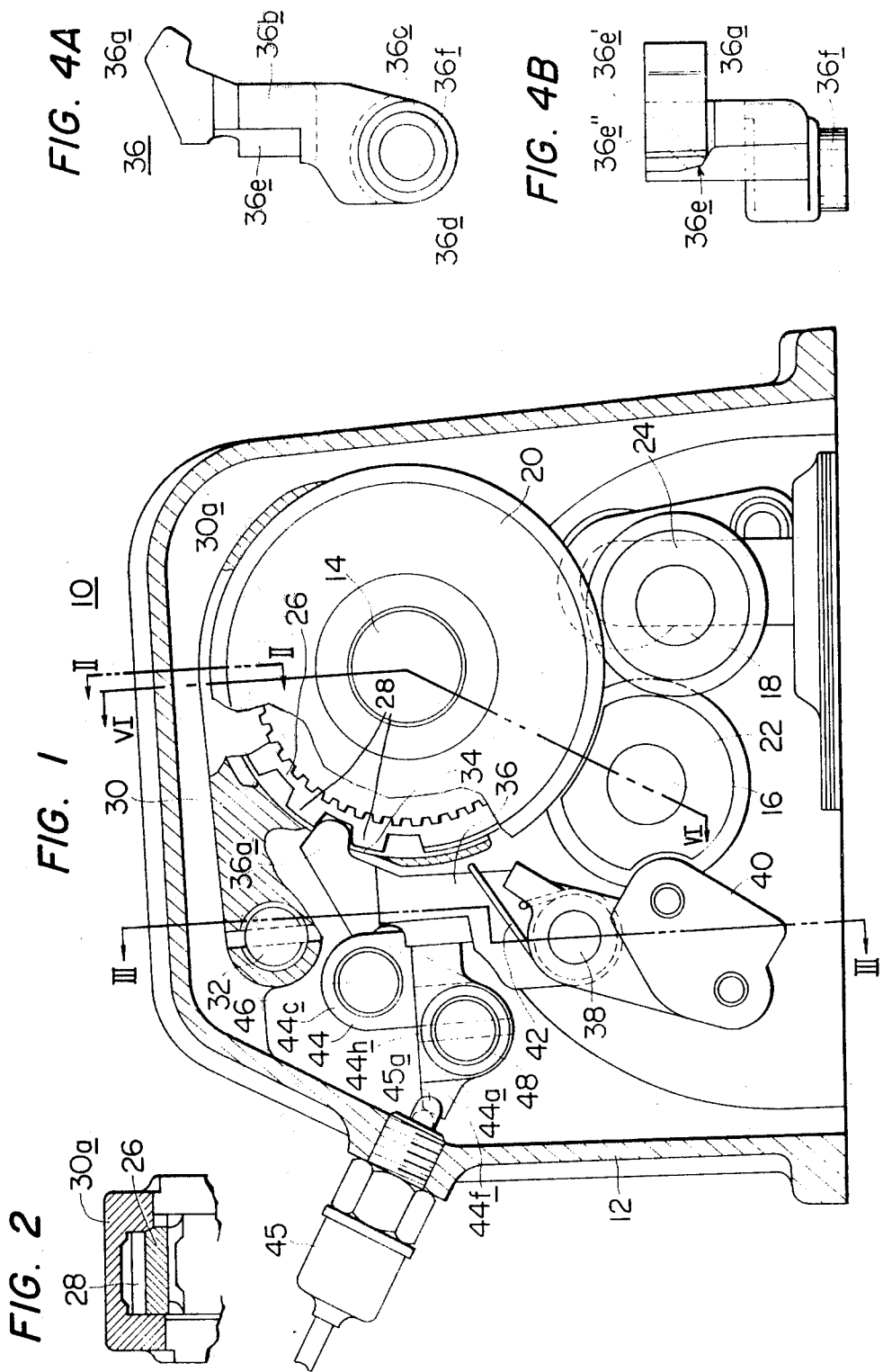

PARKING BRAKE MECHANISM FOR MOTOR VEHICLE EQUIPPED WITH POWER TRANSMISSION WITH TORQUE CONVERTER

FIELD OF THE INVENTION

The present invention relates in general to brakes, and more particularly to a parking brake mechanism for use with an automotive power transmission which is connected to the automotive engine through a torque converter.

BACKGROUND OF THE INVENTION

In a motor vehicle having a power transmission powered by an automotive engine through a fluid coupling or a torque converter, it is usual to equip the vehicle with a parking brake mechanism which is capable of anchoring the output shaft of the transmission when secure parking of the vehicle is required. However, conventional parking brake mechanisms of the type mentioned above are bulky due to their complicated constructions requiring relatively big mounting spaces in the transmission. This means that the entire construction of the transmission becomes large.

SUMMARY OF THE INVENTION

Therefore, it is an object of the present invention to provide an improved parking brake mechanism which is constructed compact in size requiring a minimum amount of space in a transmission housing.

It is another object of the present invention to provide an improved parking brake mechanism in which a coupling sleeve of the transmission is formed around its periphery with external teeth to form a parking gear.

It is still another object of the invention to provide an improved parking brake mechanism in which the release thereof to allow the free rotation of the transmission output shaft is readily effected without requiring a large operational force.

It is a further object of the present invention to provide an improved parking brake mechanism which can maintain its braking operation of the transmission output shaft even when the output shaft is urged to rotate because of standing of the vehicle on a steep slope.

According to the present invention, there is provided a parking brake mechanism for a motor vehicle transmission having a transmission output shaft and a hub fixedly mounted on the output shaft, comprising a coupling sleeve coaxially mounted around the output shaft and engageable with the hub to provide secure connection between the sleeve and the output shaft, the sleeve being formed at its periphery with a plurality of external teeth; a brake pawl mounted for rotation about an axis parallel with the axis of the output shaft and carrying a tooth engageable with a gap formed between any adjacent two of the teeth when biased toward the sleeve; and a parking cam for urging the brake pawl toward the sleeve when biased in one direction.

BRIEF DESCRIPTION OF THE DRAWINGS

Other objects and advantages of the present invention will become more apparent from the following detailed description when taken in conjunction with the accompanying drawings, in which:

FIG. 1 is a partial cross section view of a motor vehicle power transmission equipped with an improved parking brake mechanism according to the present invention;

FIG. 2 is a view taken along the line II—II of FIG. 1;

FIGS. 4A and 4B are respective side and plan views of a brake pawl employed as a part of the parking brake mechanism of the invention;

DESCRIPTION OF THE PREFERRED EMBODIMENT

Figure 6:
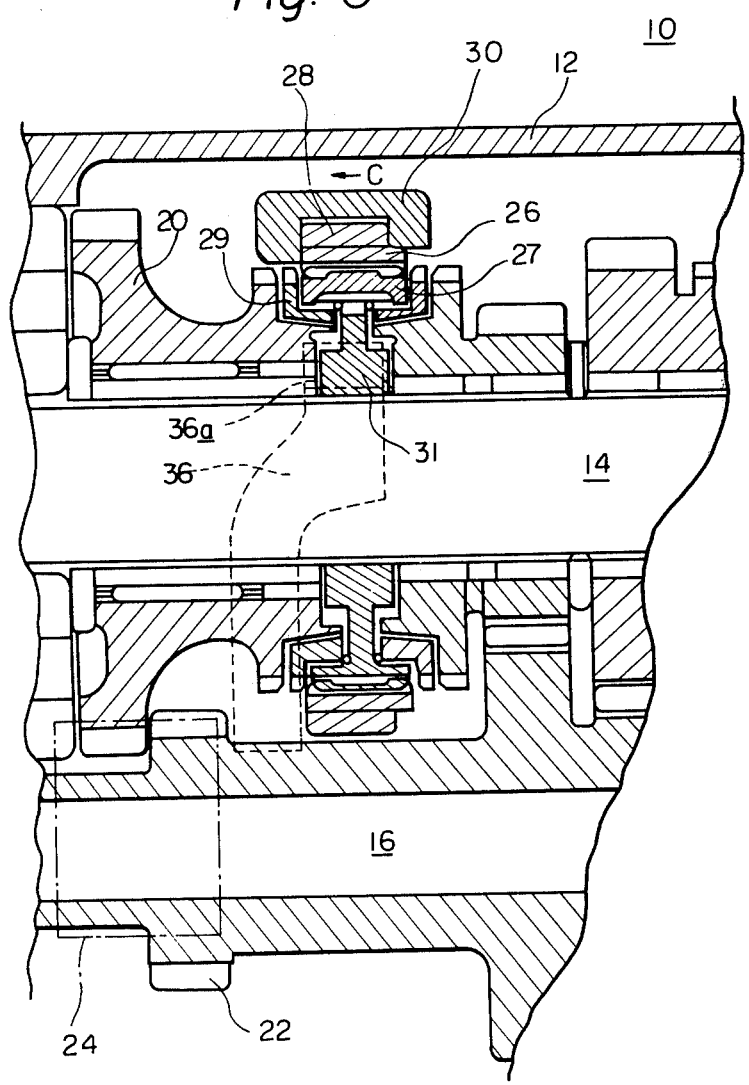
FIG. 6 is a partial vertical sectional view taken along line VI—VI of FIG. 1.

Referring to FIGS. 1 and 6 of the drawings, there is illustrated a power transmission which is generally designated by reference numeral 10 and includes therein an improved parking brake mechanism according to the invention. Although not shown, the transmission 10 is connected to an automotive engine through a torque converter.

The transmission 10 generally comprises a transmission housing 12 in which an output shaft 14, a countershaft 16 and a reverse idler shaft 18 are parallelly mounted. Output shaft gears 20, countershaft gears 22 and reverse idler gears 24 are operatively and respectively mounted around the output shaft 14, the countershaft 16 and the reverse idler shaft 18 in a conventional manner. In FIG. 1, however, only one gear in each group is illustrated. In the illustrated embodiment, the engine power from the torque converter is transmitted through the counter gear 22 to the reverse idler gear 24 and to the output shaft gear 20. By shifting a coupling sleeve 26 along the axis of the output shaft 14, in one direction, synchronization in rotational speed between the output shaft gear 20 and a hub (not shown) fixed to the output shaft 14 is completed to snugly connect the gear 20 with the hub thus transmitting the power of the output shaft gear 20 to the output shaft 14.

As will be understood from FIG. 6, if a coupling sleeve 26 is biased, by a shifting fork 30, to move along the axis of the output shaft 14 in a direction C, an insert 27 is drawn by the sleeve 26 in the same direction to push at an end thereof a balk ring 29 so that the balk ring 29 is brought into braking contact with a coned surface (no numeral) formed on the output shaft gear 20. With this, synchronization in rotational speed between the output shaft gear 20 and a hub 31 fixed to the output shaft 14 is completed, thereby permitting the coupling sleeve 26 to move more to completely mesh with a gear portion (no numeral) formed on the output shaft gear 20. Thus, connection between the hub 31 and the output shaft gear 20 is accomplished. It should be noted that the above-described mechanism is conventional, with the exception of the coupling sleeve 26 and the shifting fork 30, as will be understood from the following.

In accordance with the present invention, the coupling sleeve 26 is formed around its periphery with external teeth 28. As will be apparent hereinafter, the coupling sleeve 26 acts as a parking gear. As has been previously mentioned, the coupling sleeve 26 is moved to and fro on the output shaft 14 by means of the shifting fork 30. The shifting fork 30 is fixed to a first fork shaft 32 and has a branched off fork portion 30a covering almost half the toothed periphery of the coupling sleeve 26 so that the axial movements of the first fork shaft 32 induce to and fro movements of the coupling sleeve 26. As best seen in FIG. 2, the fork portion 30a is formed relatively wide and has a channel construction. An opening 34 is formed in the fork portion 30a at a point facing the toothed periphery of the coupling sleeve 26.

A brake pawl 36 is mounted on a support shaft 38, the pivotal movement of which moves a tooth 36a thereof into and out of engagement with a gap formed by any corresponding adjacent two of the teeth 28 on the coupling sleeve 26. This oscillation is carried out by passing the tooth 36a through the opening 34. The support shaft 38 is rotatably carried by a bracket 40 which has two projections 40a having therein aligned through holes (no numerals) through which the support shaft 38 is passed as well shown in FIG. 3. The bracket 40 is firmly connected to the housing 12 by suitable means such as bolts and nuts. The brake pawl 36 is biased by a return spring 42 in a direction in which the tooth 36a is disengaged from the gap between adjacent two teeth 28. Thus, as will be clearly described hereinafter, the locking engagement between the tooth 36a and the gap is achieved only when the brake pawl 36 is urged toward the teeth 28 against the force of the return spring 42 in response to a characteristic sliding engagement of the brake pawl 36 with a later-mentioned parking cam 44.

Figure 3:
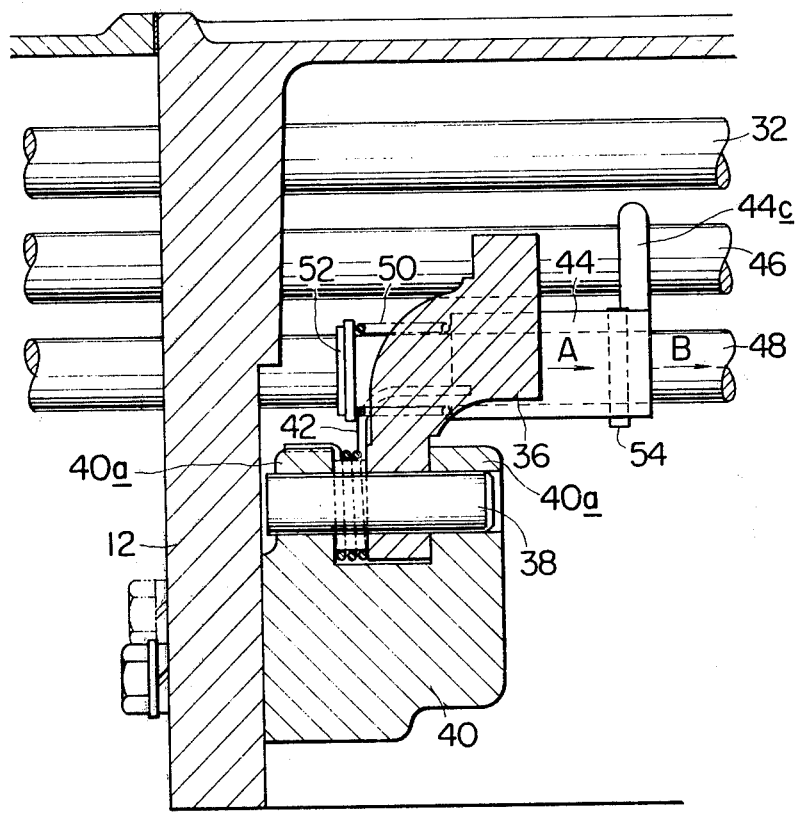
FIG. 3 is a view taken along the line III—III of FIG. 1.

As is well shown in FIGS. 4A and 4B, the brake pawl 36 is formed with a shank portion 36b between the tooth 36a and a hub portion 36c which has a through hole 36d through which the above-mentioned support shaft 38 is passed. Further, the shank portion 36b is formed at its outer side opposite to the tooth 36a with a cam surface 36e which is engageable with another cam surface 44g formed on the parking cam 44. Indicated by numeral 36f is a small diameter portion of the hub portion 36c around which multiple turns of the return spring 42 are disposed as best seen in FIG. 3. As shown in FIG. 4B, the cam surface 36e of the brake pawl 36 includes first and second inclined sections which are respectively designated by reference numerals 36e' and 36e". Now, it should be noted that the inclination angle of the first inclined section 36e' with respect to the axis of the through hole 36d of the brake pawl 36 is considerably greater than that of the second inclined section 36e" for reasons which will be described hereinafter.

Referring to FIG. 3, the parking cam 44 is shown to be carried by second and third parallel fork shafts 46 and 48 which are axially slidably disposed in the casing 12 and are parallel with the before-mentioned first fork shaft 32. These fork shafts 46 and 48 as well as the shaft 32 carry thereon their corresponding shifting forks (not shown) and are axially movable in response to shifting movements of a driver operable transmission shift lever (not shown) located in the driver compartment. In this embodiment, the first fork shaft 32 is arranged movable in response to shiftings of the transmission shift lever into an over-drive position and a reverse position, the second fork shaft 46 is movable in response to shiftings into a drive position and a low drive speed position. The third fork shaft 48 is movable in response to shiftings into the reverse position and the parking position.

Figure 5B:
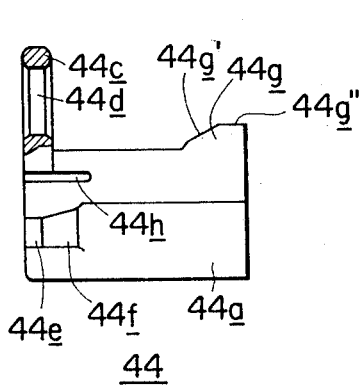
FIGS. 5A, 5B and 5C are respective side, plan and back views of a parking cam also employed in the mechanism of the invention.
Figure 5A:
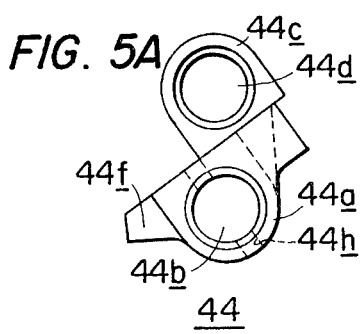
Figure 5C:
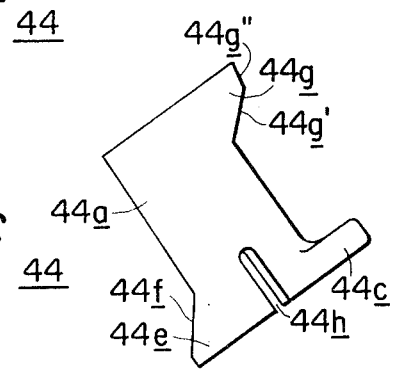

As best seen in FIGS. 5A to 5C, the parking cam 44 includes a body portion 44a on which a passage 44b for the third fork shaft 48 is formed therethrough. Projecting from an axial one side of the body portion 44a is a ring portion 44c in which an opening 44d is formed. A projection 44e is integrally provided on the side to form an inclined surface 44f at its side, the projection 44e extending substantially perpendicular to the axis of the passage 44b. This projection 44e cooperates with a back light switch 45 (see FIG. 1) to light a back light (not shown) when button 45a of the switch 45 is depressed by inclined surface 44f. Projecting from the axial other side of the body portion 44a toward opposite direction to the projection 44e is a cam surface 44g which is slidably engageable with the before-mentioned cam surface 36e of the brake pawl 36. As seen in FIGS. 5B and 5C, the cam surface 44g, similar to the cam surface 36e of the brake pawl 36, includes first and second inclined sections 44g' and 44g". It should be noted that the inclination angle of the first inclined section 44g' with respect to the axis of the passage 44b is considerably greater than that of the second inclined section 44g" for reasons which will be apparent later. Indicated by reference numeral 44h is a cut or slit which is arranged to extend to the axial one side of the body portion 44a along the axis of the passage 44b to traverse the diameter of the same.

Referring again to FIG. 3, the parking cam 44 is arranged to slide axially along the second and third fork shafts 46 and 48 by allowing the shafts to respectively pass through the opening 44d of the ring portion 44c and the passage 44b of the body portion 44a. In this instance, the arrangement between the parking cam 44 and the brake pawl 36 is such that the first inclined section 44g' of the parking cam 44 does not contact (or slightly contacts) the first inclined section 36e' of the brake pawl 36 under a condition wherein the tooth 36a of the brake pawl 36 is completely disengaged from the gap of the teeth 28 of the coupling sleeve 26. The ring portion 44c is for preventing the parking cam 44 from rotating about the third fork shaft 48 and for achieving smooth axial movement of the body portion 44a along the shaft 48. For urging the parking cam 44 rightwardly, as viewed along the arrow A shown in the drawing, a coil spring 50 is disposed around the third shaft 48 between the axial other side of the parking cam 44 and a spring seat 52 fixed to the third fork shaft 48. Indicated by numeral 54 is a stop pin which is fixedly disposed in a diametrically extending through hole (no numeral) formed in the third fork shaft 48 so as to cooperate with the cut 44h of the parking cam 44 for limiting the axial rightward movement of the parking cam 44. Under inoperative or neutral position of the third fork shaft 48, the cam surface 44g of the parking cam 44 is axially separated from the cam surface 36e of the brake pawl 36 not to rotate the brake pawl 36 toward the teeth 28 formed on the coupling sleeve 26. However, as will be described next, the axial rightward movement of the third fork shaft 48 from its rest position induces the rotation of the brake pawl 36 toward the teeth 28 in a direction in which the tooth 36a is engaged with the top land of any one of the teeth 28 or the gap between adjacent two teeth 28.

With the above-described construction of the parking brake mechanism of the present invention, the operation thereof is as follows:

While the transmission shift lever (not shown) is positioned at either the driving positions or the neutral position, the third fork shaft 48 stays in its rest or neutral position wherein the cam surface 44g of the parking cam 44 is disengaged from that of the brake pawl 36. Thus, the tooth 36a of the brake pawl 36 is kept separated from the gap between teeth 28 on the coupling sleeve 26 thus permitting free rotation of the output shaft 14 of the transmission 10.

Under a standstill or the like of the vehicle, when the shift lever (not shown) of the transmission is moved by the driver to a parking position, the first fork shaft 32 is moved (or remains stationary) to allow the coupling sleeve 26 to stay in a neutral position wherein the coupling sleeve 26 engages with only the hub 31 fixed to the output shaft 14, and simultaneously the third fork shaft 48 is moved rightwardly, as viewed along arrow B shown in FIG. 3. By this movement of the shaft 48, the parking cam 44 is instantly brought into contact at its first inclined section 44g' with the first inclined section 36e' of the brake pawl 36 and thus, if the tooth 36a of the brake pawl 36 is in alignment with the gap between adjacent two teeth 28 of the coupling sleeve 26, the first inclined section 44g' rides up the first inclined section 36e' and then the second inclined section 44g'' rides up the second inclined section 36e'' urging the brake pawl 36, more specifically, the tooth 36a into engagement with the gap between the teeth 28 against the force of the return spring 42. By this, the output shaft 14 is completely locked achieving secure locking of the vehicle.

If the tooth 36a is misaligned from the gap between the teeth 28, the riding up operation of the first inclined section 44g' against the first inclined section 36e' is stopped just when the tooth 36a contacts the peripheral outer surface of the corresponding one of the teeth 28. In this state, however, the parking cam 44 is constantly applied with the biasing force of the compressed coil spring 50, thus, the brake pawl 36 is constantly biased to rotate toward the teeth 28. Thus, as soon as the tooth 36a of the brake pawl 36 and the gap between the teeth 28 come into alignment upon slight rotation of the coupling sleeve 26, the cam surface 44g'' of the parking cam 44 completely rides upon the cam surface 36e'' of the brake pawl 36 with a result that the tooth 36a of the brake pawl 36 is brought into engagement with a gap between the teeth 28 thereby locking the coupling sleeve 26 and thus the output shaft 14. Upon complete engagement of the tooth 36a of the brake pawl 36 with a gap, further axial movement of the parking cam 44 is securely stopped by the stop pin 54 which then contacts a bottom of the cut 44h of the parking cam 44.

When release of the parking brake is required, the shift lever of the transmission is shifted back by the driver to the neutral position. By this action, the third fork shaft 48 is moved leftwardly in FIG. 3, from the previously set parking position while moving the parking cam 44 leftwardly by the fixed stop pin 22, so that the cam surface 44g of the parking cam 44 is disengaged from the cam surface 36e of the brake pawl 36. Thus, the brake pawl 36 returns to its original inoperative position by the force of the return spring 42 disengaging its tooth 36a from a gap between the teeth 28 on the coupling sleeve 26. Accordingly, the output shaft 14 is freely rotatable. It should be noted that, because of the provision of the second inclined section with a small inclination on each cam surface 44g and 36e, the initial release action of the parking cam 44 from the brake pawl 36 in operating condition is easily made without requiring a large force. The reason of this advantageous fact will be described next.

In a parking condition wherein the second inclined section 44g'' of the parking cam 44 is engaged with the second inclined section 36e'' of the braking pawl 36, slight rotation of the coupling sleeve 26 due to slight movement of the parked vehicle will cause a force which tends to separate the tooth 36a of the brake pawl 36 from a gap between the teeth 28 of the coupling sleeve 26, the magnitude of the separation force being increased by a force exerted by the return spring 42. Thus, in such a condition, if the frictional resistance generated between the contacting surfaces of both the second inclined sections 44g'' and 36e'' is slightly greater than the increased separation force, the release action for separating or disengaging the sections 44g'' and 36e'' from each other requires only a small force. In fact, the force actually used for unlocking the output shaft 14 is the difference between the frictional resistance and the separation force. It should be noted that in the invention, the gently sloped second inclined sections 44g'' and 36e'' are for obtaining the above-mentioned frictional force, and the steeply sloped first inclined sections 44g' and 36e' are for achieving quick locking motion of the brake pawl 36 with a short axial movement of the parking cam 44.

Furthermore, in this invention, the urging force of the coil spring 50 in working state is selected so as to be considerably greater than the frictional resistance between the second inclined sections 44g'' and 36e'' for achieving secure contact between same. This means that the locking engagement of the tooth 36a of the brake pawl 36 against the coupling sleeve 26 becomes complete.

It should be also noted that the leftward movement of the third fork shaft 48 from its rest or neutral position allows the inclined surface 44f of the projection 44e of the parking cam 44 to push the button 45a of the back light switch 45 with a result that the back light (not shown) is on.

It should be further noted that the foregoing description shows only an exemplary embodiment. Various modifications and improvements are apparent to those skilled in the art without departing from the scope of the present invention which is only defined by the appended claims.

What is claimed is:

1. A parking brake mechanism for a motor vehicle transmission having a transmission output shaft, a hub fixedly mounted on said output shaft, and an output shaft gear rotatable about said output shaft, said mechanism comprising:
   a coupling sleeve coaxially slidably mounted around said hub and engageable with both said hub and said output shaft gear to provide secure connection between said output shaft gear and said output shaft, said sleeve being formed at its periphery with a plurality of external teeth having gaps therebetween;
   a brake pawl mounted to rotate about an axis parallel with the axis of said output shaft, said brake pawl carrying a tooth which engages with one of the gaps formed between adjacent teeth of said sleeve when said brake pawl is biased to swing toward said coupling sleeve; and
   a parking cam for urging said brake pawl to swing toward the teeth of said coupling sleeve, said parking cam biasing said brake pawl into engagement with the teeth of said coupling sleeve when said vehicle transmission is shifted into a parking position.

2. A parking brake mechanism as claimed in claim 1, further comprising a shifting fork for shifting said coupling sleeve in response to movement of a manually operated shift lever, said shifting fork being formed with an opening through which said tooth of said brake pawl is passable to engage with said gap.

3. A parking brake mechanism as claimed in claim 1, further comprising a first biasing means for biasing said brake pawl in a direction to disengage said tooth from said gap, and a second biasing means for biasing said parking cam into a position wherein said parking cam biases said brake pawl into engagement with the teeth of said coupling sleeve.

4. A parking brake mechanism as claimed in claim 3, further comprising a fork shaft carrying thereon a shifting fork and slidably supporting said parking cam by passing through a passage formed in said parking cam.

5. A parking brake mechanism as claimed in claim 4, in which said fork shaft is arranged parallel with the axis of said output shaft.

6. A parking brake mechanism as claimed in claim 5, in which said parking cam is provided with a projection having an opening through which another fork shaft is slidably passed, said another fork shaft being parallel with said previously mentioned fork shaft.

7. A parking brake mechanism as claimed in claim 5, in which said second biasing means is a coil spring which is disposed around said fork shaft between a spring seat fixed to said shaft and one end of said parking cam.

8. A parking brake mechanism as claimed in claim 7, in which said brake pawl is formed at a side thereof opposite to another side thereof facing the peripheral outer surfaces of said teeth with a first cam portion, and said parking cam is formed at a side thereof engageable with said first cam portion of said brake pawl with a second cam portion.

9. A parking brake mechanism as claimed in claim 8, in which each of said first and second cam portions includes a first inclined section and a second inclined section the inclination angle of which, with respect to the axis of said fork shaft, is considerably smaller than that of said first inclined section, the engagement of the second inclined section of said parking cam with the second inclined section of said brake pawl inducing a rotation of said brake pawl in a direction to engage the tooth thereof with said gap thereby to lock said coupling sleeve.

10. A parking brake mechanism as claimed in claim 9, further comprising a stop pin which is fixed to said fork shaft and engageable with the other end of said parking cam to limit the movement of said parking cam in a direction to engage the second cam portion with said first cam portion.

11. A parking brake mechanism as claimed in claim 10, in which said parking cam is formed with a cut extending to the other end thereof for receiving in it said stop pin.

* * * * *